United States Patent [19]
Yokoyama

[11] Patent Number: 5,715,006
[45] Date of Patent: Feb. 3, 1998

[54] APPARATUS FOR AND METHOD OF MOTION COMPENSATION WITH BOUNDARYCORRECTION FOR MOVING PICTURE

[75] Inventor: Yutaka Yokoyama, Tokyo, Japan

[73] Assignee: NEC Corporation, Tokyo, Japan

[21] Appl. No.: 308,449

[22] Filed: Sep. 19, 1994

[30] Foreign Application Priority Data

Sep. 28, 1993 [JP] Japan .................. 5-240984

[51] Int. Cl.⁶ .................................................. H04N 7/18
[52] U.S. Cl. .................. 348/416; 348/415; 348/412; 348/644; 348/420; 348/421
[58] Field of Search .................... 348/415, 416, 348/412, 699, 700, 421, 420, 169, 170

[56] References Cited

U.S. PATENT DOCUMENTS

| | | | |
|---|---|---|---|
| 5,151,784 | 9/1992 | Lavagetto et al. | 348/699 |
| 5,247,586 | 9/1993 | Gobert | 348/700 |
| 5,260,782 | 11/1993 | Hui | 348/416 |
| 5,301,019 | 4/1994 | Citta | 348/416 |
| 5,309,237 | 5/1994 | Singh | 348/607 |
| 5,311,305 | 5/1994 | Mahadevan et al. | 348/416 |
| 5,329,379 | 7/1994 | Rodriguez et al. | 358/433 |
| 5,347,311 | 9/1994 | Golin | 348/416 |
| 5,355,168 | 10/1994 | Sugiyama | 348/416 |
| 5,357,287 | 10/1994 | Koo et al. | 348/699 |
| 5,367,385 | 11/1994 | Yuan | 348/420 |
| 5,367,629 | 11/1994 | Chu et al. | 348/400 |
| 5,369,449 | 11/1994 | Yukitake | 348/416 |
| 5,384,849 | 1/1995 | Jeong | 348/420 |
| 5,392,073 | 2/1995 | Jeong | 348/699 |
| 5,398,068 | 3/1995 | Liu et al. | 348/699 |
| 5,428,395 | 6/1995 | Jeong | 348/420 |
| 5,455,629 | 10/1995 | Sun et al. | 348/420 |
| 5,475,434 | 12/1995 | Kim | 348/420 |

*Primary Examiner*—Tommy P. Chin
*Assistant Examiner*—Akand B. Rao
*Attorney, Agent, or Firm*—Sughrue, Mion, Zinn, Macpeak & Seas, PLLC

[57] ABSTRACT

A motion compensated predicting device compensates motion by segmenting a reference image to generate an initial predicted image and estimated value correcting information. The correcting information includes area segmentation information, motion information of each area, information of each pixel not assigned with an estimated value, and information of each pixel assigned with several estimated values. An estimated value correcting device references the initial predicted image and the estimated value correcting information to decide the value of the pixel for which a unique estimated value is missing in the initial predicted image so as to finally produce a motion compensation predicted image. Through interpolation, motion vectors are decided for a portion for which estimated values cannot be uniquely determined, and hence the contour of the overall area is kept remained and distortion of area boundaries is minimized. This leads to a motion compensation estimating apparatus capable of keeping a continuous motion of pixels, which are not uniquely assigned with estimated values, with respect to peripheral area of the pixels.

10 Claims, 5 Drawing Sheets

PORTIONS FOR WHICH ESTIMATED VALUES ARE MISSING

PORTIONS IN WHICH PIXELS ARE ASSIGNED WITH SEVERAL ESTIMATED VALUES $$\bar{x} = \frac{t\bar{a} + s\bar{b}}{s + t}$$

$$\overline{x} = \frac{s\overline{a} + t\overline{b}}{s+t}$$

PORTION FOR WHICH ESTIMATED VALUES ARE MISSING $$\overline{x} = \frac{f(s)\overline{a} + f(t)\overline{b}}{f(s) + f(t)}$$

PORTION IN WHICH PIXELS ARE ASSIGNED WITH SEVERAL ESTIMATED VALUES $$\overline{x} = \frac{g(s)\overline{a} + g(t)\overline{b}}{g(s) + g(t)}$$

APPARATUS FOR AND METHOD OF MOTION COMPENSATION WITH BOUNDARYCORRECTION FOR MOVING PICTURE

BACKGROUND OF THE INVENTION

The present invention relates to a motion compensated prediction apparatus, for example, to a motion compensated prediction apparatus for encoding a moving picture.

DESCRIPTION OF THE RELATED ART

According to a method described in an article of the transaction of the 1993 National Conference of IEICE (Japan), D-292, pp. 7–53 entitled "A Study on Motion Compensation Based on Segmentation by Isodensity Areas", an image is subdivided into isodensity areas having identical density so as to conduct motion compensation for each isodensity area. In this method, a preceding frame image is first linearly quantized such that adjacent pixels in a same level are gathered into an area to extract an isodensity area. Subsequently, for each extracted area of the preceding frame image, matching is conducted with respect to a current frame image to detect information of motion. Finally, motion compensation is accomplished for each extracted area to generate a motion compensated prediction image. Processing of the motion compensation technique will be specifically described by reference to FIGS. 1A and 1B.

FIG. 1A shows results of segmentation of a reference image and motion estimated for each segmented area. Motion compensation is carried out for each of the subdivided areas. Each area is displaced and transformed according to motion information associated therewith to create a motion compensated prediction image as shown in FIG. 1B.

However, according to the conventional technique of motion compensation for each segmented area, a preceding frame image as a reference image is partitioned and motion is compensated for each of the partitioned areas to generate a predicted image.

In consequence, when there are detected several areas having motion discontinuity therebetween in the reference image like in the case of FIG. 1A, there may occur pixels for which estimated values cannot be uniquely determined in boundaries of the motion compensated predicted image as shown in FIG. 1B. That is, as can be seen from the dotted portions of FIG. 1B, pixels on the reference image are moved to inappropriate different positions due to motion compensation. Moreover, if there are no pixels to be moved to a portion, there will appear pixels for which estimated values are missing.

In a case that several pixels existing at mutually different positions on the reference image are moved to an identical position due to motion compensation as shown in the hatched portions, there occur pixels assigned with several estimated values. In this situation, according to the motion compensating procedure, estimated values of pixels in the pertinent portion can be decided. As the motion compensating procedure, there may be employed a method in which, for example, the estimated image is initialized to beforehand specified values; thereafter, displaced and transformed areas are sequentially overwritten thereon.

In this method, the specified initial values are assigned to the pixels for which estimated values are missing; whereas, the last overwritten values are selected for the pixels for which several estimated values are assigned. In this method, however, since the portion for which estimated values are missing is replaced with the fixed initial values, there is lost continuity of motion in the portion between adjacent areas thereof.

In the portion of which pixels are assigned with several estimated values, an area last moved thereto deletes portions of an area which has been previously moved thereto and these areas are combined with each other. Resultantly, estimated values become discontinuous in boundaries of the predicted image.

The prior technology as described above is consequently attended with a problem of visually unnatural distortion in boundary portions.

SUMMARY OF THE INVENTION

It is therefore an object of the present invention to provide a motion compensated prediction apparatus in which motion compensation is conducted in an area for pixels thereof for which unique estimated values are not determined so as to keep continuity of motion between the pertinent area and its peripheral areas, thereby determining estimated values and minimizing distortion in the boundary portion.

In accordance with the present invention, there is provided a motion compensated prediction apparatus for motion compensation for a moving picture and thereby encoding the picture. The apparatus includes motion compensated prediction means for subdividing a reference image into several areas, compensating motion for each of the subdivided areas, producing an initial predicted image, and outputting estimated value correcting information including area segmentation information used to compensate motion for each of the areas, motion information of each of the areas, and information of a displaced pixel position in the motion compensated prediction and estimated value correcting means for referencing the estimated value correcting information, deciding through interpolation motion vectors at the pixel position from motion information of several areas in the vicinity of the displaced pixel position in the initial predicted image, deciding thereby estimated values, correcting the initial predicted image, and outputting a motion compensated prediction image.

The information at the displaced pixel position includes information of a pixel position for which estimated value is missing in the initial predicted image, and the estimated value at a pixel position for which estimated value is missing, is favorably decided according to motion information of several areas in the proximity of the displaced pixel position.

The information at the displaced pixel position includes information of a pixel position assigned with several estimated values in the initial predicted image, and the estimated value at a pixel position assigned with several estimated values is desirably decided according to motion information of several areas in the proximity of the displaced pixel position.

In accordance with the present invention, there is provided a motion compensated prediction method of motion compensation for a moving picture and thereby encoding the picture. The method includes a motion compensation prediction step of subdividing a reference image into several areas, compensating motion for each of the subdivided areas, producing an initial predicted image, and outputting estimated value correcting information including area segmentation information used to compensate motion for each of the areas, motion information of each of the areas, and information of a predetermined pixel position in the motion compensated prediction and an estimated value correcting step of referencing the estimated value correcting information, deciding through interpolation motion vectors at the pixel position from motion information of several areas in the vicinity of the predetermined pixel position in the initial predicted image, deciding thereby estimated values, correcting the initial predicted image, and outputting a motion compensation predicted image.

The information at the predetermined pixel position includes information of a pixel position for which estimated value is missing in the initial predicted image, and the estimated value at a pixel position for which estimated value is missing is favorably decided according to motion information of several areas in the proximity of the displaced pixel position.

The information at the displaced pixel position includes information of a pixel position assigned with several estimated values in the initial predicted image, and the estimated value at a pixel position assigned with several estimated values is desirably decided according to motion information of several areas in the proximity of the predetermined pixel position.

In consequence, according to primary portions of the motion compensation prediction apparatus and method of the present invention, a reference image is partitioned into several areas so as to effect motion compensation for each partitioned area, thereby producing an initial predicted image. Area segmentation information used for motion compensation in each area, motion information of each area, and information of predetermined pixel positions in motion compensation prediction are outputted collectively as information of estimated value correction. By reference to the information of estimated value correction, motion vectors at a preset pixel position are obtained by interpolating motions of several proximity areas of the pixel position in the initial predicted image so as to attain estimated values. The initial predicted image is corrected by the estimated values to finally produce a motion compensation predicted image.

As a result, continuity of motion is guaranteed in the boundary portions of the motion compensation predicted image.

BRIEF DESCRIPTION OF THE DRAWINGS

The objects and features of the present invention will become more apparent from the consideration of the following detailed description taken in conjunction with the accompanying drawings wherein.

DESCRIPTION OF THE PREFERRED EMBODIMENTS

Referring now to the accompanying drawings, description will now be given in detail of embodiments of the motion compensated predicting apparatus and method in accordance with the present invention. FIGS. 2 to 6 show embodiments of the motion compensated predicting apparatus and method in accordance with the present invention.

Figure 1A:
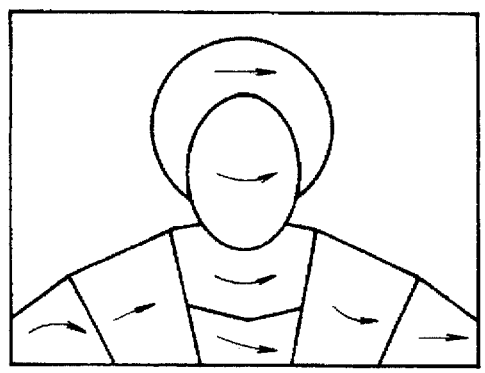
FIGS. 1A and 1B are schematic diagrams for explaining a method of compensating motion based on area segmentation of a reference image in a motion compensating apparatus of the prior art.
Figure 1B:
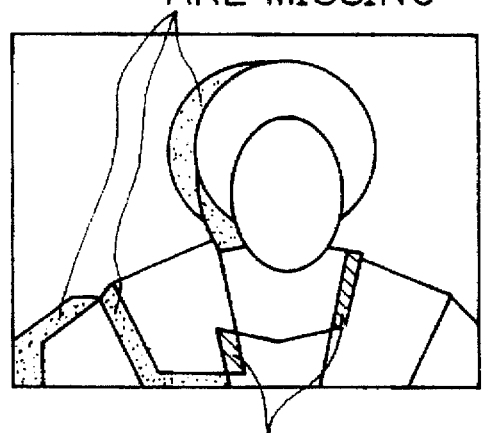
Figure 2:
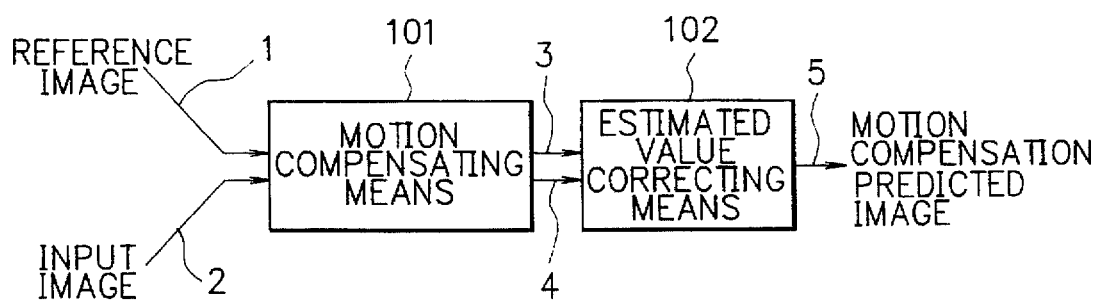
FIG. 2 is a block diagram showing the functional configuration of an embodiment of the motion compensation prediction apparatus in accordance with the present invention.

FIG. 2 shows in a block diagram the structure of the embodiment of the motion compensated prediction apparatus in accordance with the present invention. The configuration includes motion compensated prediction means 101 and estimated position correcting means 102.

In the apparatus thus structured, the motion compensated prediction means 101 accomplishes motion compensation through area segmentation of a reference image to create an initial predicted image 3 and estimated value correcting information 4. The correcting information 4 includes information of area segmentation, information of motion of each segmented area, information of pixels for which estimated values are missing, and information of pixels each being assigned with several estimated values. The estimated value correcting means 102 references the initial predicted image 3 and the estimated value correcting information 4 to determine values of pixels for which unique estimated values are missing so as to finally generates a motion compensation prediction image 5.

In the above embodiment, for each pixel for which an estimated value is missing in the initial predicted image 3, motion vectors are calculated from motion information of several areas in the neighborhood of the pertinent pixel. First, motion vectors at the pertinent pixel position are computed from information of motion of the area with respect to its peripheral areas. The vectors are weighted according to distances between the pertinent pixel and boundaries of the respective areas to obtain motion vectors of the pertinent pixel through interpolation. As the weight values, there may be adopted, for example, reciprocal numbers of values of distances from area boundaries. Alternatively, there may be used values reversely proportional to n-th power (n is a positive number) of the distances.

The above operation will be described by reference to FIGS. 3A to 3E. As can be seen from FIG. 3A, when motions are discontinuous between adjacent areas and area displacement is carried out in a direction to increase distance therebetween, the motion compensation predicted image 5 includes a gap as indicated by dots in FIG. 3B. Estimated values cannot be obtained for pixels in this area. For each pixel X in this portion, motion vectors $\vec{a}$ and $\vec{b}$ at the position of the pixel X are calculated according to information of motions of areas A and B in the vicinity of the pixel X as shown in FIG. 3E. Moreover, distances s and t between the pixel X and the respective area boundaries are measured. A motion vector $\vec{x}$ at the position of the pixel X can be obtained as a function of $\vec{a}$, $\vec{b}$, s, and t.

For example, when there are used weights inversely proportional to distances, the value of motion vector $\vec{x}$ is expressed as follows.

$$\vec{x} = \frac{\frac{1}{s}\vec{a} + \frac{1}{t}\vec{b}}{\frac{1}{s} + \frac{1}{t}} = \frac{t\vec{a} + s\vec{b}}{s+t} \quad (1)$$

To measure distance between a pixel outside the area and the boundary thereof, it is only necessary to repeatedly expand the area so as to count the number of expanding operations by when the boundary reaches the pixel. In the expansion processing of the objective area, outer pixels which exist on a boundary of an area are enclosed in the pertinent area.

Figure 3A:
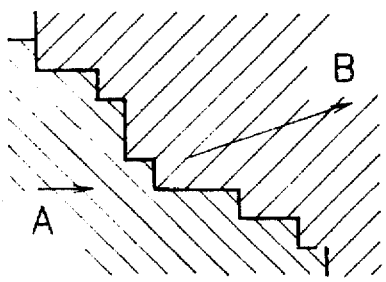
FIGS. 3A to 3E are diagrams useful to explain the contents of processing effected for a portion for which estimated values of motion compensation are missing in accordance with the present invention.
Figure 3B:
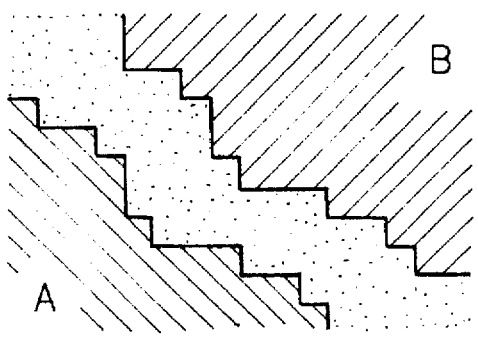
Figure 3C:
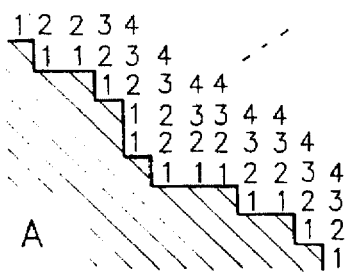
Figure 3D:
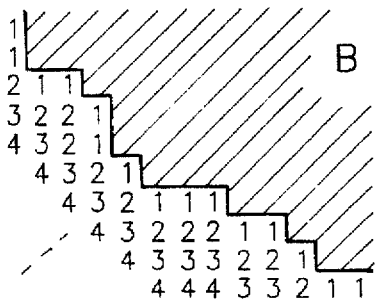
Figure 3E:
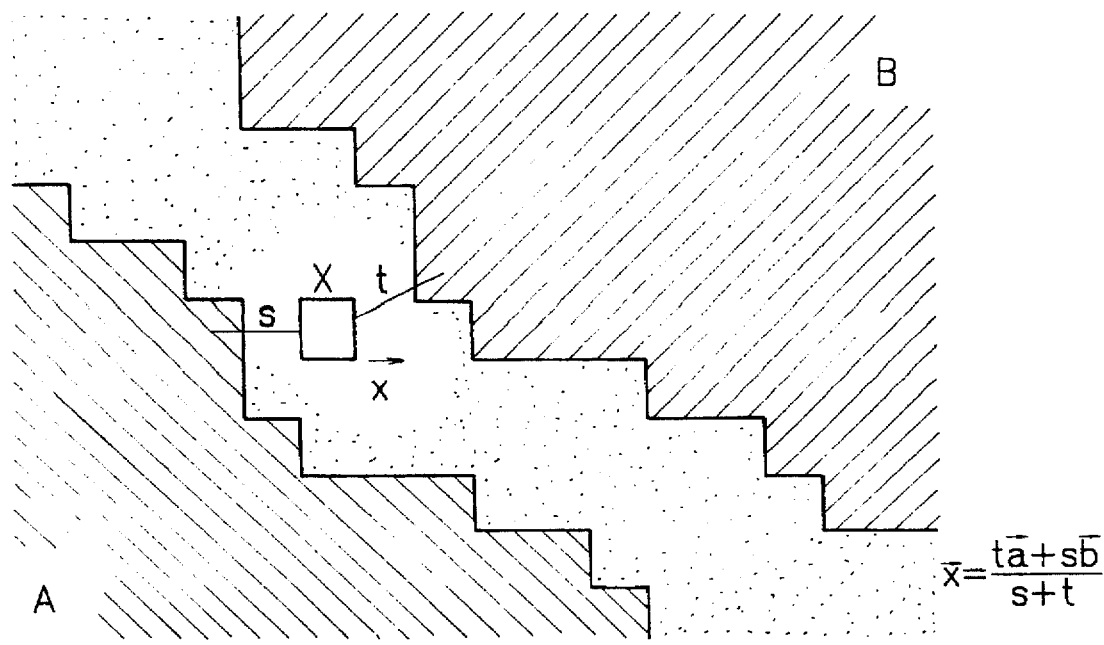

FIGS. 3C and 3D show, by way of example, computation results of distances between the pixel and the respective areas A and B. In the diagrams, numbers indicate the distances of the pixel positions outside the pertinent areas.

The motion vector calculation may be analogously achieved even when three or more moving object areas exist in the proximity of the pixel. Moving object areas are judged to be in the neighborhood of the pixel, for example, as follows.

Presetting a threshold value, distance between the objective pixel and the area boundary is compared with the threshold value. When the distance is within the threshold value, the area is decided to be in the vicinity of the pixel.

In accordance with a second aspect of the present invention, for each pixel assigned with several estimated values in the estimated initial image 3, motion vectors are calculated from information of motions of the areas associated with estimated values. That is, first, according to motion information of the pertinent pixel for the areas associated with estimated values, motion vectors are respectively obtained at the pertinent pixel position. Weighting the obtained vectors according to distances between the pixel and the respective area boundaries, there are attained motion vectors for the pixel through interpolation. As the weights, there may be adopted, for example, distances between the pixel and the area boundaries as well as values proportional to n-th power (n is a positive number) of distances.

Figure 4A:
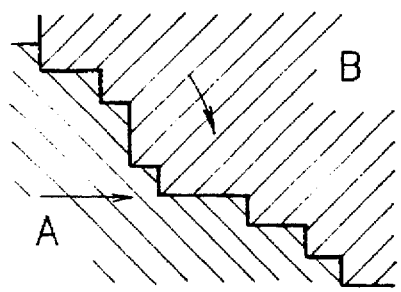
FIGS. 4A to 4E are diagrams for explaining the contents of processing effected for a portion of which pixels are assigned with several motion compensation estimated values in accordance with the present invention.
Figure 4B:
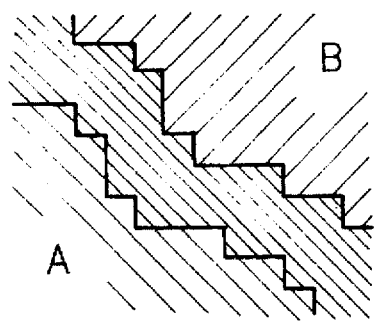
Figure 4C:
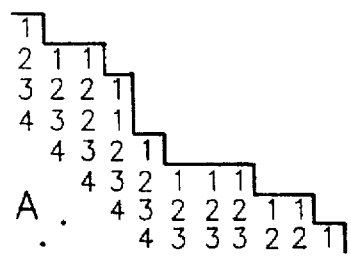
Figure 4D:
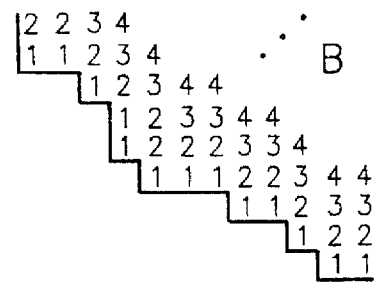
Figure 4E:
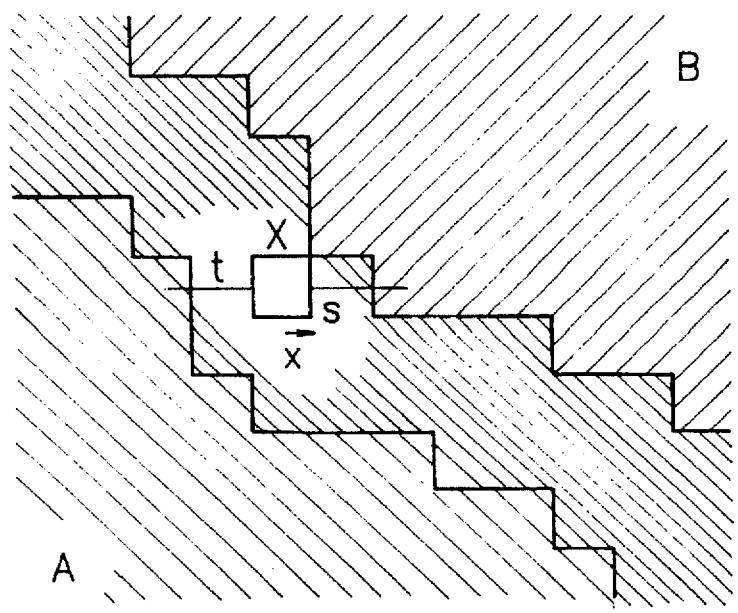

The above processing will now be described by reference to FIGS. 4A to 4E. As can be seen from FIG. 4A, when motions are discontinuous between adjacent areas and the areas overlap with each other, the estimated initial image 3 includes an overlapped portion as indicated by hatching in FIG. 4B. In this portion, there are obtained several estimated values for each pixel. For a pixel X in this region, motion vectors $\vec{a}$ and $\vec{b}$ at the position of the pixel X are computed according to motion information of areas A and B related to estimated values as shown in FIG. 4E. Furthermore, there are measured distances s and t between the pixel and the respective area boundaries. The motion vector $\vec{x}$ at the position of the pixel X is represented as a function of $\vec{a}$, $\vec{b}$, s, and t.

Utilizing, for example, weights proportional to distances, the value of the motion vector $\vec{x}$ is expressed as follows.

$$\vec{x} = \frac{s\vec{a} + t\vec{b}}{s+t} \quad (2)$$

In order to measure distances between a pixel in an area and a boundary thereof, it is only necessary to repeatedly achieve a shrinking operation of the area to count the number of repeated shrinking operations executed by when the pixel is deleted from the resultant area. In the shrinking operation of an area, the pixels existing on the boundary of the area are deleted therefrom. FIGS. 4C and 4D show calculation results of distances between the pixel and the areas A and B. Numbers in the diagrams designate distances between the pixel position in the areas and the boundaries thereof.

The motion vectors can be computed in a similar manner even when there exist three or more areas for which estimated values are to be determined.

Figure 5:
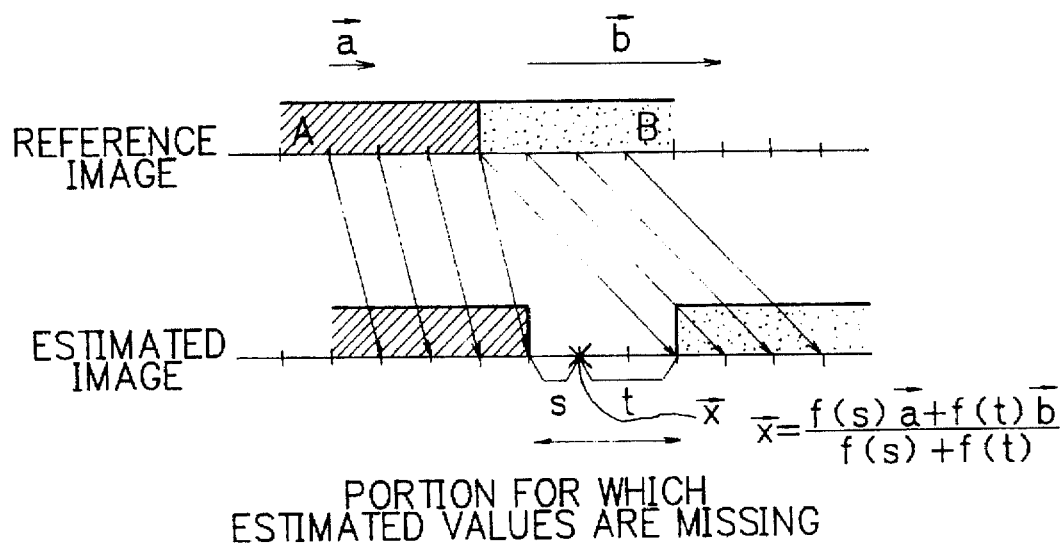
FIG. 5 is a diagram useful to explain the procedure of deciding estimated values for a portion of which motion compensation estimated values are missing in accordance with the present invention.
Figure 6:
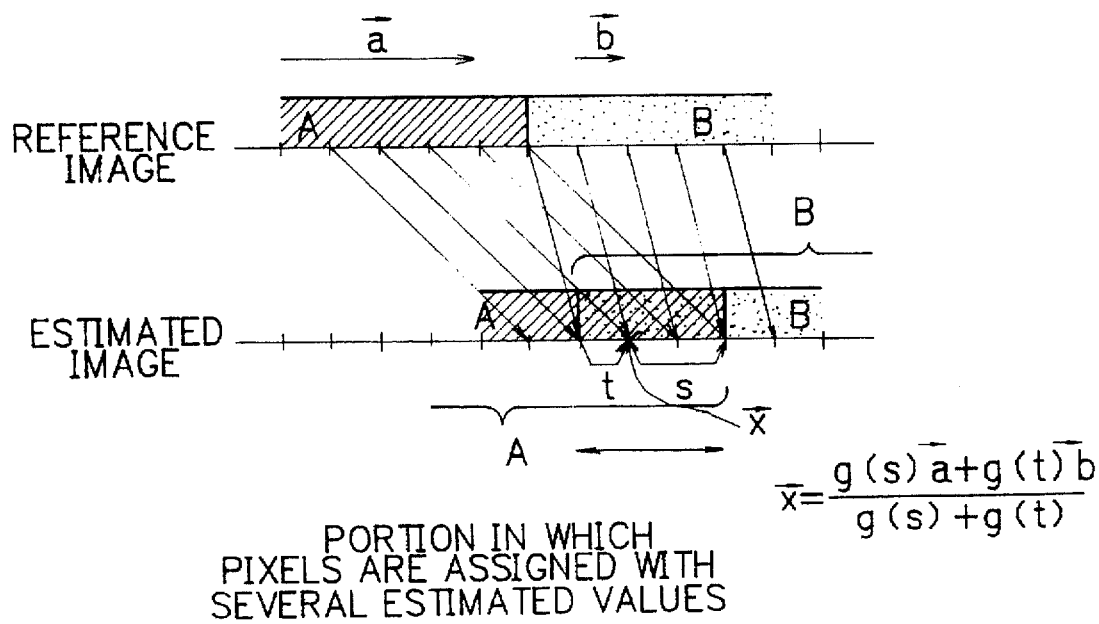
FIG. 6 is a diagram for explaining the procedure of determining estimated values for a portion of which pixels are assigned with several motion compensation estimated values in accordance with the present invention.

Referring now to FIGS. 5 and 6, description will be given of the procedure of the method of estimating motion compensation in accordance with the present invention.

FIGS. 5 and 6 show, for easy understanding of description of the apparatus, a portion of an area boundary of an image in a one-dimensional direction. For a general image, the apparatus is to be considered in a two-dimensional configuration. In this diagram, information of motion of the area is represented with a uniform vector in the area.

In a case where, as shown in FIG. 5, motion vectors $\vec{a}$ and $\vec{b}$ of areas A and B adjaccent to each other in a reference image are moved in a direction to be apart from each other, there appears between the areas a portion in which estimated values are missing. To uniquely decide estimated values for a pixel X in this portion, interpolation is effected with motion vectors $\vec{a}$ and $\vec{b}$ of peripheral areas A and B to determine the motion vector for the pixel.

First, distances s and t between the pixel X and boundaries respectively of the nearby areas A and B are measured and then weight coefficients f(s) and f(t) respectively of the motion vectors $\vec{a}$ and $\vec{b}$ are calculated according to the weighting function f associated with distances. The distances are measured from nearby area boundaries toward the outside thereof. To reduce influence of the area upon the weighting coefficients f(s) and f(t) as the distance from the boundary is increased, the weighting coefficients f(s) and f(t) are represented with a function monotonously decreasing with respect to increase in distance from the area boundary.

The motion vector $\vec{x}$ of the pixel X is decided as follows.

$$\vec{x} = \frac{f(s)\vec{a} + f(t)\vec{b}}{f(s) + f(t)} \quad (3)$$

Similarly, in a case where, as shown in FIG. 6, the motion vectors $\vec{a}$ and $\vec{b}$ of the areas adjacent to each other in the reference image are discontinuous and the areas overlap with each other, there takes place a portion in which several estimated values are assigned between the areas. To determine an estimated value for a pixel X in this portion, interpolation is effected using motion vectors $\vec{a}$ and $\vec{b}$ of the overlapped areas A and B to produce a motion vector for the pixel X.

First of all, distances s and t between the pixel X and boundaries respectively of the overlapped areas A and B are measured and then weight coefficients g(s) and g(t) respectively of the motion vectors $\vec{a}$ and $\vec{b}$ are calculated according to the weighting function g associated with distances. The distances are measured from boundaries of the overlapped region toward the inside thereof. To increase influence of the area upon the weighting coefficients g(s) and g(t) as the distance from the boundary toward the inner portion of the area is increased, the weighting coefficients g(s) and g(t) are represented with a function monotonously increasing with respect to increase in distance from the area boundary. The motion vector $\vec{x}$ of the pixel X is decided as follows.

$$\vec{x} = \frac{g(s)\vec{a} + g(t)\vec{b}}{g(s) + g(t)} \quad (4)$$

The present invention is also applicable to other than the case where motion information is represented by one motion vector in each area. Namely, the present invention can be easily expanded for a case in which a motion vector at each position in an area is represented by a function to express motion according to parameters of the function. For example, assume that a motion vector at a pixel position P in an area A is represented by a function $\vec{VA}$ (P) and a motion vector at a pixel position Q in an area B is represented by a function VB (Q). In this situation, there are attained using the functions motion vectors $\vec{VA}(X)$ and $\vec{VB}(X)$ at a pixel position X not assigned with a unique estimated value so as to adopt the vector $\vec{VA}(X)$ and $\vec{VB}(X)$ for the interpolation. That is, distances s and t between the pixel X and boundaries respectively of the areas A and B are measured and then weight coefficients h(s) and h(t) respectively for the motion vectors $\vec{VA}(X)$ and $\vec{VB}(X)$ are calculated according to the weighting function h associated with distances. The motion vector $\vec{x}$ for the pixel X is then decided as follows.

$$\vec{x} = \frac{h(s) \cdot \vec{VA}(x) + h(t) \cdot \vec{VB}(x)}{h(s) + h(t)} \quad (5)$$

The weighting function is selected from the functions f(s), f(t), g(s) and g(t) according to processing of the portion for which estimated values are missing between the areas or processing of the portion for which several esstimated values are assigned between the areas.

As described above, for a pixel not uniquely assigned with an estimated value, the motion vector of the pixel is decided through interpolation using motion information of areas in the vicinity thereof to accomplish motion compensation, thereby reducing distortion of area boundaries.

While the embodiment has been described according to a favorable example of the present invention, the present invention is not restricted by the embodiment. It is possible to change or to modify the embodiment without departing from the scope and sprit of the present invention.

As can be clear from the above description, according to the principal portions of the motion compensation prediction apparatus and method of the present invention, a reference image is split into several areas so as to achieve motion compensation for each partitioned area to produce an initial predicted image. Area segmentation information used to compensate motion for each area, motion information of each area, and information of a displaced pixel position in estimation of motion compensation are outputted collectively as estimated value correcting information. Referencing the estimated value correcting information, motion vectors at the pixel position are obtained through interpolation according to motion information of several areas in the vicinity of the displaced pixel position in the initial predicted image so as to determine estimated values. According to the estimated values, the initial predicted image is modified to produce a motion compensation predicted image.

In consequence, motion vectors of the portion for which unique estimated values are missing are decided through interpolation to thereby compensate motion. This enables a motion compensation predicted image to be created while keeping the contour of the overall area and thereby to minimize distortion of area boundary portions.

Furthermore, the motion compensation predicted image is almost free of visually unnatural distortion. Consequently, when means for encoding predicted errors is combined with the above system, a visually satisfactory image can be generated with a reduced amount of codes. This makes it possible to materialize a moving picture encoder of quite a low rate.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A motion compensated prediction apparatus for a moving picture and thereby encoding the moving picture, comprising:

motion compensated prediction means for subdividing a reference image into several areas, compensating motion for each of the subdivided areas, producing an initial predicted image, and outputting estimated value correcting information including area segmentation information used to compensate motion for each of the areas, motion information of each of the areas, and information of a displaced pixel position in a motion compensation prediction; and estimated value correcting means for referencing the estimated value correcting information, uniquely determining motion vectors of respective pixels in the motion compensation prediction from motion information of several areas in a vicinity of the displaced pixel position in the initial predicted image, deciding thereby estimated values, correcting the initial predicted image, and outputting a motion compensation predicted image so as to reduce distortion in boundary portions of adjacent ones of said areas.

2. A motion compensation prediction apparatus in accordance with claim 1, wherein the information regarding the displaced pixel position includes information of a pixel position for which estimated value is missing in the initial predicted image, and the estimated value of the pixel position for which estimated value is missing being decided according to motion information of several areas proximal to the displaced pixel position.

3. A motion compensated prediction apparatus in accordance with claim 1, wherein the information regarding the displaced pixel position includes information of a pixel position assigned with several estimated values in the initial predicted image, and the estimated value of the pixel position assigned with several estimated values being decided according to motion information of several areas proximal to the displaced pixel position.

4. A motion compensated prediction method for a moving picture and thereby encoding the moving picture, comprising:

a motion compensated predicting step of subdividing a reference image into several areas, compensating motion for each of the subdivided areas, producing an initial predicted image, and outputting estimated value correcting information including area segmentation information used to compensate motion for each of the areas, motion information of each of the areas, and information of a displaced pixel position in a motion compensation prediction; and an estimated value correcting step of referencing the estimated value correcting information, uniquely determining motion vectors of respective pixels in the motion compensation prediction from motion information of several areas in a vicinity of the displaced pixel position in the initial predicted image, deciding thereby estimated values, correcting the initial predicted image, and outputting a motion compensation predicted image so as to reduce distortion in boundary portions of adjacent ones of said areas.

5. A motion compensated prediction method in accordance with claim 4, wherein the information regarding the displaced pixel position includes information of a pixel position for which estimated value is missing in the initial predicted image, and the estimated value of the pixel position for which estimated value is missing being decided according to motion information of several areas proximal to the displaced pixel position.

6. A motion compensated prediction method in accordance with claim 4, wherein the information regarding the displaced pixel position includes information of a pixel position assigned with several estimated values in the initial predicted image, and the estimated value of the pixel position assigned with several estimated values being decided according to motion information of several areas proximal to the displaced pixel position.

7. A motion compensation prediction apparatus in accordance with claim 1, wherein the areas are isodensity areas.

8. A motion compensation prediction method in accordance with claim 4, wherein the areas are isodensity areas.

9. A motion compensation prediction apparatus in accordance with claim 1, wherein the areas are subdivided into arbitrarily shaped regions.

10. A motion compensation prediction method in accordance with claim 4, wherein the areas are subdivided into arbitrarily shaped regions.

* * * * *